United States Patent
Vu et al.

(10) Patent No.: US 8,836,656 B2
(45) Date of Patent: *Sep. 16, 2014

(54) CHANNEL SCAN LOGIC

(75) Inventors: Minh-Dieu Thi Vu, Cupertino, CA (US);
Thomas James Wilson, Pleasanton, CA (US); Christoph Horst Krah, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 13/343,604

(22) Filed: Jan. 4, 2012

(65) Prior Publication Data

US 2012/0098778 A1    Apr. 26, 2012

Related U.S. Application Data

(63) Continuation of application No. 11/650,201, filed on Jan. 3, 2007, now Pat. No. 8,094,128.

(51) Int. Cl.
*G06F 3/041*    (2006.01)

(52) U.S. Cl.
USPC ........ 345/173; 345/179; 345/204; 178/18.01; 713/2

(58) Field of Classification Search
USPC ............ 345/173–179, 204; 178/18.01–18.04; 710/14; 713/2
See application file for complete search history.

(56) References Cited

U.S. PATENT DOCUMENTS

| | | | |
|---|---|---|---|
| 4,899,138 A | 2/1990 | Araki et al. | |
| 5,396,443 A | 3/1995 | Mese et al. | |
| 5,483,261 A | 1/1996 | Yasutake | |
| 5,488,204 A | 1/1996 | Mead et al. | |
| 5,825,352 A | 10/1998 | Bisset et al. | |
| 5,831,593 A | 11/1998 | Rutledge | |
| 5,835,079 A | 11/1998 | Shieh | |
| 5,880,411 A | 3/1999 | Gillespie et al. | |
| 6,054,979 A | 4/2000 | Sellers | |
| 6,188,391 B1 | 2/2001 | Seely et al. | |
| 6,236,386 B1 | 5/2001 | Watanabe | |
| 6,239,788 B1 | 5/2001 | Nohno et al. | |
| 6,310,610 B1 | 10/2001 | Beaton et al. | |
| 6,323,846 B1 | 11/2001 | Westerman et al. | |

(Continued)

FOREIGN PATENT DOCUMENTS

| | | |
|---|---|---|
| CA | 2318815 A1 | 7/1999 |
| CN | 1367424 A | 9/2002 |

(Continued)

OTHER PUBLICATIONS

Non-Final Office Action mailed Nov. 16, 2012, for U.S. Appl. No. 12/022,572, filed Jan. 30, 2008, 24 pages.

(Continued)

*Primary Examiner* — Kimhung Nguyen
(74) *Attorney, Agent, or Firm* — Morrison & Foerster LLP

(57) ABSTRACT

A device that can autonomously scan a sensor panel is disclosed. Autonomous scanning can be performed by implementing channel scan logic. In one embodiment, channel scan logic carries out many of the functions that a processor would normally undertake, including generating timing sequences and obtaining result data; comparing scan result data against a threshold value (e.g., in an auto-scan mode); generating row count; selecting one or more scanning frequency bands; power management control; and performing an auto-scan routine in a low power mode.

18 Claims, 9 Drawing Sheets

(56) References Cited

U.S. PATENT DOCUMENTS

| | | |
|---|---|---|
| 6,417,845 B1 | 7/2002 | Chen et al. |
| 6,690,387 B2 | 2/2004 | Zimmerman et al. |
| 6,856,259 B1 | 2/2005 | Sharp |
| 6,888,536 B2 | 5/2005 | Westerman et al. |
| 7,015,894 B2 | 3/2006 | Morohoshi |
| 7,180,477 B2 | 2/2007 | Howell |
| 7,184,064 B2 | 2/2007 | Zimmerman et al. |
| 7,254,775 B2 | 8/2007 | Geaghan et al. |
| 7,663,607 B2 | 2/2010 | Hotelling et al. |
| 7,714,846 B1 | 5/2010 | Gray |
| 7,737,957 B2 | 6/2010 | Lee et al. |
| 7,825,912 B2 | 11/2010 | Lee |
| 8,049,732 B2 | 11/2011 | Hotelling et al. |
| 8,085,247 B2 | 12/2011 | Wilson |
| 8,094,128 B2 * | 1/2012 | Vu et al. .................... 345/173 |
| 8,125,456 B2 | 2/2012 | Krah et al. |
| 8,310,472 B2 | 11/2012 | Vu et al. |
| 8,390,588 B2 | 3/2013 | Vu et al. |
| 8,471,837 B2 | 6/2013 | Vu et al. |
| 8,479,122 B2 | 7/2013 | Hotelling et al. |
| 8,542,208 B2 | 9/2013 | Krah et al. |
| 2003/0107557 A1 | 6/2003 | Liebenow et al. |
| 2004/0001048 A1 | 1/2004 | Kraus et al. |
| 2004/0056845 A1 | 3/2004 | Harkcom et al. |
| 2004/0060986 A1 | 4/2004 | Bean et al. |
| 2004/0087840 A1 | 5/2004 | Main |
| 2005/0104867 A1 | 5/2005 | Westerman et al. |
| 2005/0144524 A1 | 6/2005 | Bonaccio et al. |
| 2005/0146511 A1 | 7/2005 | Hill et al. |
| 2006/0026521 A1 | 2/2006 | Hotelling et al. |
| 2006/0092143 A1 | 5/2006 | Kasai et al. |
| 2006/0097991 A1 | 5/2006 | Hotelling et al. |
| 2006/0114247 A1 | 6/2006 | Brown |
| 2006/0139340 A1 | 6/2006 | Geaghan |
| 2006/0197753 A1 | 9/2006 | Hotelling |
| 2006/0202969 A1 | 9/2006 | Hauck |
| 2006/0238518 A1 | 10/2006 | Westerman et al. |
| 2006/0238519 A1 | 10/2006 | Westerman et al. |
| 2006/0238520 A1 | 10/2006 | Westerman et al. |
| 2006/0274792 A1 | 12/2006 | Abhishek et al. |
| 2006/0278444 A1 | 12/2006 | Binstead |
| 2006/0284857 A1 | 12/2006 | Oh |
| 2007/0035528 A1 | 2/2007 | Hodge |
| 2007/0047738 A1 | 3/2007 | Ballantyne et al. |
| 2007/0109274 A1 | 5/2007 | Reynolds |
| 2007/0236478 A1 | 10/2007 | Geaghan et al. |
| 2007/0273660 A1 | 11/2007 | XiaoPing |
| 2008/0012835 A1 | 1/2008 | Rimon et al. |
| 2008/0153418 A1 | 6/2008 | Melanson |
| 2008/0157782 A1 | 7/2008 | Krah |
| 2008/0157882 A1 | 7/2008 | Krah |
| 2008/0158172 A1 | 7/2008 | Hotelling et al. |
| 2008/0158177 A1 | 7/2008 | Wilson et al. |
| 2008/0162996 A1 | 7/2008 | Krah et al. |
| 2008/0162997 A1 | 7/2008 | Vu et al. |
| 2008/0309625 A1 | 12/2008 | Krah et al. |
| 2009/0027360 A1 | 1/2009 | Kwan et al. |
| 2009/0189867 A1 | 7/2009 | Krah et al. |
| 2010/0164898 A1 | 7/2010 | Vu et al. |
| 2010/0173680 A1 | 7/2010 | Vu et al. |
| 2010/0188356 A1 | 7/2010 | Vu et al. |
| 2012/0157167 A1 | 6/2012 | Krah et al. |
| 2012/0162129 A1 | 6/2012 | Krah et al. |

FOREIGN PATENT DOCUMENTS

| | | |
|---|---|---|
| CN | 2672701 Y | 1/2005 |
| CN | 1744023 A | 3/2006 |
| CN | 1881148 A | 12/2006 |
| EP | 0 626 633 A1 | 11/1994 |
| EP | 0 626 633 B1 | 11/1994 |
| EP | 1 058 924 A1 | 12/2000 |
| GB | 2 419 950 A | 5/2006 |
| JP | 02-272617 A | 11/1990 |
| JP | 04-096816 A | 3/1992 |
| JP | 04-308916 A | 10/1992 |
| JP | 06-067793 A | 3/1994 |
| JP | 06-119090 A | 4/1994 |
| JP | 09-198186 A | 7/1997 |
| JP | 10-111749 A | 4/1998 |
| JP | 2000-163031 A | 6/2000 |
| JP | 2002-342033 A | 11/2002 |
| JP | 2005-092341 A | 4/2005 |
| JP | 2007-533044 A | 11/2007 |
| TW | 524352 U | 3/2003 |
| WO | WO-2005/114369 A2 | 12/2005 |
| WO | WO-2005/114369 A3 | 12/2005 |
| WO | WO-2008/085720 A1 | 7/2008 |
| WO | WO-2008/085417 A2 | 9/2008 |
| WO | WO-2008/085417 A3 | 9/2008 |

OTHER PUBLICATIONS

Notice of Allowance mailed Nov. 20, 2012, for U.S. Appl. No. 12/726,126, filed Mar. 17, 2010, five pages.

Chinese Office Action mailed Oct. 10, 2008, for CN Application No. 200820006265.2, filed Dec. 22, 2007, seven pages (with English translation.).

Chinese Search Report mailed Dec. 17, 2010, for CN Application No. 200820006265.2, filed Jan. 3, 2007, with English Translation, 10 pages.

Final Office Action mailed Nov. 2, 2011, for U.S. Appl. No. 12/022,572, filed Jan. 30, 2008, 20 pages.

International Search Report mailed Apr. 28, 2008, for PCT Application No. PCT/US2007/088751, filed Dec. 22, 2007, two pages.

International Search Report mailed Jul. 8, 2008, for PCT Application No. PCT/US2007/026179, filed Dec. 21, 2007, two pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action mailed May 3, 2010, for U.S. Appl. No. 11/650,201, filed Jan. 3, 2007, eight pages.

Non-Final Office Action mailed Feb. 23, 2011, for U.S. Appl. No. 11/650,201, filed Jan. 3, 2007, six pages.

Non-Final Office Action mailed Apr. 29, 2011, for U.S. Appl. No. 12/022,572, filed Jan. 30, 2008, 14 pages.

Non-Final Office Action mailed Jun. 8, 2011, for U.S. Appl. No. 11/650,040, filed Jan. 3, 2007, nine pages.

Non-Final Office Action mailed Jun. 20, 2011, for U.S. Appl. No. 11/650,201, filed Jan. 3, 2007, six pages.

Notice of Allowance mailed Nov. 25, 2011, 2011, for U.S. Appl. No. 11/650,040, filed Jan. 3, 2007, seven pages.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Non-Final Office Action mailed Mar. 19, 2012, for U.S. Appl. No. 12/726,107, filed Mar. 17, 2010, eight pages.

Non-Final Office Action mailed Mar. 21, 2012, for U.S. Appl. No. 12/726,126, filed Mar. 17, 2012, eight pages.

Non-Final Office Action mailed Apr. 12, 2012, for U.S. Appl. No. 12/022,572, filed Jan. 30, 2008, 21 pages.

Supplementary European Search Report mailed Feb. 21, 2012, for EP Application No. 07866002.4, seven pages.

Non-Final Office Action mailed Jan. 22, 2013, for U.S. Appl. No. 13/405,221, filed Feb. 24, 2012, seven pages.

Final Office Action mailed Aug. 3, 2012, for U.S. Appl. No. 12/022,572, filed Jan. 30, 2008, 22 pages.

Final Office Action mailed Aug. 10, 2012, for U.S. Appl. No. 12/726,126, filed Mar. 17, 2012, five pages.

Notice of Allowance mailed Jul. 9, 2012, for U.S. Appl. No. 12/726,107, filed Mar. 17, 2010, seven pages.

Notice of Allowance mailed Feb. 19, 2013, for U.S. Appl. No. 12/723,437, filed Mar. 12, 2010, eight pages.

Notice of Allowance mailed Mar. 1, 2012, for U.S. Appl. No. 12/723,437, filed Mar. 12, 2010, seven pages.

(56) References Cited

OTHER PUBLICATIONS

Final Office Action mailed Apr. 10, 2013, for U.S. Appl. No. 12/022,572, filed Jan. 30, 2008, 25 pages.
Non-Final Office Action mailed Jul. 5, 2013, for U.S. Appl. No. 13/340,153, filed Dec. 29, 2011, 14 pages.
Notice of Allowance mailed Jun. 20, 2013, for U.S. Appl. No. 13/405,221, filed Feb. 24, 2012, six pages.
Taiwan Search Report received May 16, 2011, for TW Patent Application No. 097100213, one page.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

CHANNEL SCAN LOGIC

CROSS-REFERENCE TO RELATED APPLICATIONS

This application is a continuation of U.S. patent application Ser. No. 11/650,201, filed Jan. 3, 2007, the entire disclosure of which is incorporated herein by reference for all purposes.

FIELD OF THE INVENTION

This invention relates generally to sensor panels used as input devices for computing systems, and more particularly, using logic circuitry to autonomously detect and process events (e.g., a touching or a near touching of an object) on a sensor panel.

BACKGROUND OF THE INVENTION

Many types of input devices are presently available for performing operations in a computing system, such as buttons or keys, mice, trackballs, touch panels, joysticks, touch screens and the like. Touch screens, in particular, are becoming increasingly popular because of their ease and versatility of operation as well as their declining price. Touch screens may include a touch panel, which may be a clear panel with a touch-sensitive surface. The touch panel may be positioned in front of a display screen so that the touch-sensitive surface covers the viewable area of the display screen. Touch screens may allow a user to make selections and move a cursor by simply touching the display screen via a finger or stylus. In general, the touch screen may recognize the touch and position of the touch on the display screen, and the computing system may interpret the touch and thereafter perform an action based on the touch event.

One limitation of many conventional touch panel technologies is that they are only capable of reporting a single point or touch event, even when multiple objects come into contact with the sensing surface. That is, they lack the ability to track multiple points of contact at the same time. Thus, even when two points are touched, these conventional devices only identify a single location, which is typically the average between the two contacts (e.g. a conventional touchpad on a notebook computer provides such functionality). This single-point identification is a function of the way these devices provide a value representative of the touch point, which is generally by providing an average resistance or capacitance value.

Moreover, detecting and processing of events detected on a sensor panel can take a significant amount of processing power. The significant amount of processing can make a processor too busy to perform other functions and can slow down devices using a sensor panel. Additionally, processors typically consume a significant amount of power during operation, which can be particularly problematic when a sensor panel is used in conjunction with a hand held device, as many hand-held devices have a limited power supply.

SUMMARY OF THE INVENTION

Accordingly, various embodiments of the invention can autonomously scan a sensor panel, with little or no intervention from a processor. Autonomous scanning can be performed by implementing channel scan logic. In one embodiment, channel scan logic carries out many of the functions that a processor would normally undertake, including generating row count; selecting one or more scanning frequency bands; generating timing sequences and obtaining result data; comparing scan result data against a threshold value (e.g., in an auto-scan mode); power management control; and performing an auto-scan routine in a low power mode.

Use of channel scan logic to implement one or more of the above described functions can permit a processor to perform other tasks or power down. For example, in an auto-scan mode, channel logic performs periodic scans of a sensor panel with the sensor system in a low power mode. Once input is detected, then channel scan logic can wake up the processor. In a scan assist mode, the channel scan logic autonomously scans a sensor panel and provides results of the scans to the processor for further processing.

Channel scan logic may be also programmed to scan a sensor panel in one of a number of different ways. For example, channel scan logic can be programmed to scan a sensor panel using a continuous mode, a row-by-row mode, a frame-by-frame mode or a dual frame mode. Additional timing and row scanning parameters may also be varied to perform a desired scan. Accordingly, channel scan logic is very flexible.

DETAILED DESCRIPTION OF THE PREFERRED EMBODIMENT

Figure 1:
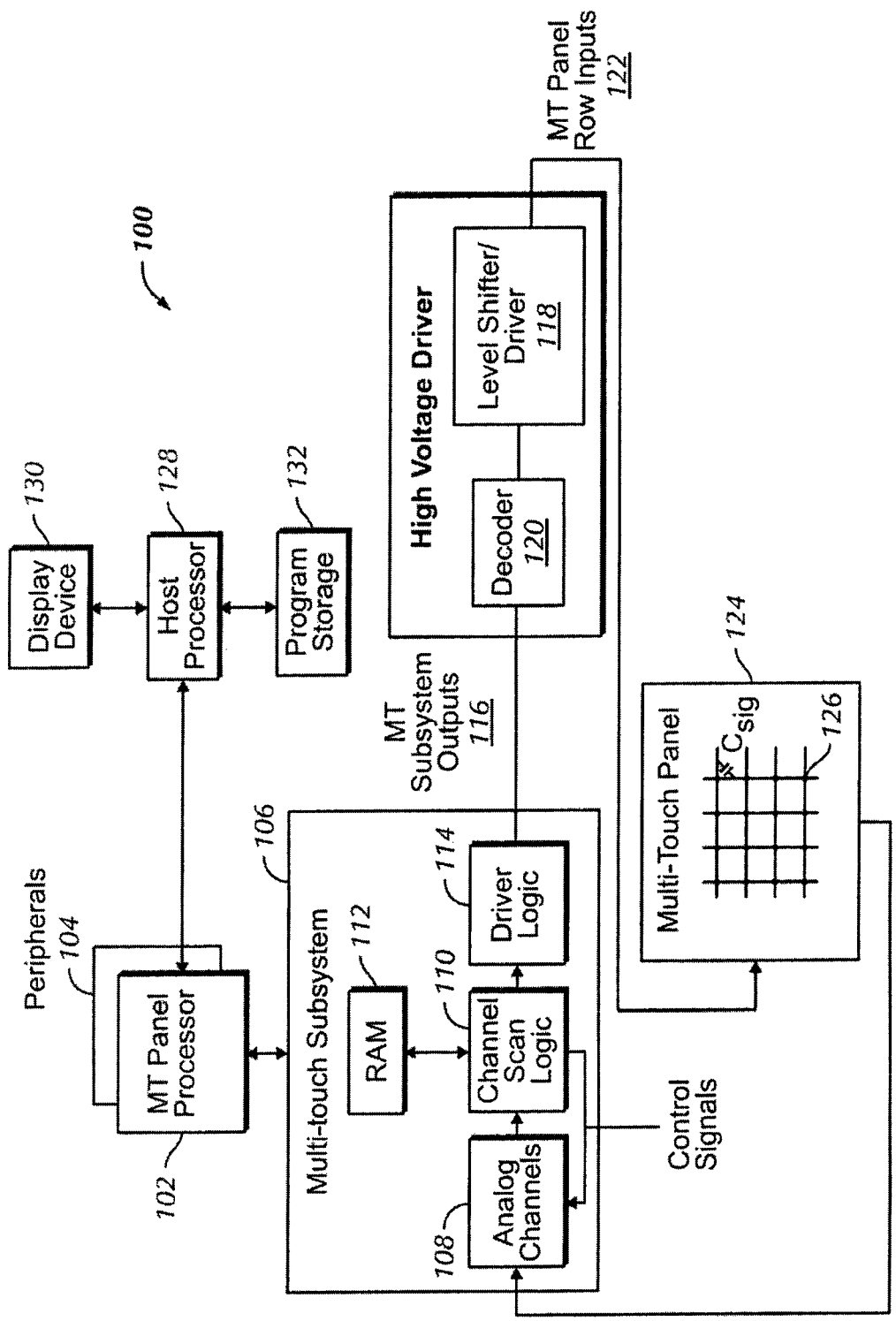
FIG. 1 illustrates a computing system utilizing a multi-touch panel input device in accordance with one embodiment of the invention.

In the following description of preferred embodiments, reference is made to the accompanying drawings which form a part hereof, and in which it is shown by way of illustration specific embodiments in which the invention may be practiced. It is to be understood that other embodiments may be used and structural changes may be made without departing from the scope of the preferred embodiments of the present invention.

A plurality of touch sensors in a multi-touch panel can enable a computing system to sense multi-touch events (the touching of fingers or other objects upon a touch-sensitive surface at distinct locations at about the same time) and perform additional functions not previously available with touch sensor devices.

Although some embodiments may be described herein in terms of capacitive touch sensors in a multi-touch panel, it should be understood that embodiments of the invention are not so limited, but are generally applicable to the use of any type of multi-touch sensor technology that may include resistive touch sensors, surface acoustic wave touch sensors, electromagnetic touch sensors, near field imaging touch sensors, and the like. Furthermore, although the touch sensors in the multi-touch panel may be described herein in terms of an orthogonal array of touch sensors having rows and columns, it should be understood that embodiments of the invention are not limited to orthogonal arrays, but may be generally applicable to touch sensors arranged in any number of dimensions and orientations, including diagonal, concentric circle, and three-dimensional and random orientations.

In general, multi-touch panels may be able to detect multiple touches (touch events or contact points) that occur at or about the same time, and identify and track their locations. Examples of multi-touch panels are described in Applicant's co-pending U.S. application Ser. No. 10/840,862 entitled "Multipoint Touchscreen," filed on May 6, 2004 and issued as U.S. Pat. No. 7,663,607 on Feb. 16, 2010, the contents of which are incorporated by reference herein.

It should be understood that although embodiments of this invention are primarily described herein for use with touch sensor panels, proximity sensor panels may also be used to generate modulated output signals for detection by the analog channels. Proximity sensor panels are described in Applicants' concurrently filed U.S. application Ser. No. 11/649,998 entitled "Proximity and Multi-Touch Sensor Detection and Demodulation," filed on Jan. 3, 2007 and published as U.S. Published Application No. 2008/0158172 on Jul. 3, 2008, the contents of which are incorporated herein by reference.

Furthermore, although this disclosure may describe detecting input in terms of touch-events, it should be understood that the various embodiments disclosed herein may detect near touches or hover events as well. Accordingly, a touch, a near-touch or a hover may be referred to as an "event" and multiple events that occur at or about the same time may be referred to as "multi-events."

FIG. 1 illustrates computing system 100 using touch sensors according to one embodiment. Computing system 100 may correspond to computing devices such as desktops, laptops, tablets or handhelds, including personal digital assistants (PDAs), digital music and/or video players and mobile telephones. Computing system 100 may also correspond to public computer systems such as information kiosks, automated teller machines (ATM), point of sale machines (POS), industrial machines, gaming machines, arcade machines, vending machines, airline e-ticket terminals, restaurant reservation terminals, customer service stations, library terminals, learning devices, and the like.

Computing system 100 may include one or more multi-touch panel processors 102 and peripherals 104, and multi-touch subsystem 106. The one or more processors 102 can be ARM968 processors or other processors with similar functionality and capabilities. However, in other embodiments, the multi-touch panel processor functionality may be implemented instead by dedicated logic such as a state machine. Peripherals 104 may include, but are not limited to, random access memory (RAM) or other types of memory or storage, watchdog timers and the like. Multi-touch subsystem 106 may include, but is not limited to, one or more analog channels 108, channel scan logic 110 and driver logic 114. Channel scan logic 110 may access RAM 112, autonomously read data from the analog channels and provide control for the analog channels. This control may include multiplexing columns of multi-touch panel 124 to analog channels 108. In addition, channel scan logic 110 may control the driver logic and stimulation signals being selectively applied to rows of multi-touch panel 124. In some embodiments, multi-touch subsystem 106 may be integrated into a single application specific integrated circuit (ASIC).

Driver logic 114 can provide multiple multi-touch subsystem outputs 116 and can present a proprietary interface that drives high voltage driver, which is comprised of decoder 120 and subsequent level shifter and driver stage 118, although level-shifting functions could be performed before decoder functions. Level shifter and driver 118 can provide level shifting from a low voltage level (e.g. CMOS levels) to a higher voltage level, providing a better signal-to-noise (S/N) ratio for noise reduction purposes. Decoder 120 can decode the drive interface signals to one out of N outputs, whereas N is the maximum number of rows in the panel. Decoder 120 can be used to reduce the number of drive lines needed between the high voltage driver and multi-touch panel 124. Each multi-touch panel row input 122 can drive one or more rows in multi-touch panel 124. In some embodiments, driver 118 and decoder 120 can be integrated into a single ASIC. However, in other embodiments driver 118 and decoder 120 can be integrated into driver logic 114, and in still other embodiments driver 118 and decoder 120 can be eliminated entirely.

Multi-touch panel 124 can in some embodiments include a capacitive sensing medium having a plurality of row traces or driving lines and a plurality of column traces or sensing lines, although other sensing media may also be used. The row and column traces may be formed from a transparent conductive medium, such as Indium Tin Oxide (ITO) or Antimony Tin Oxide (ATO), although other transparent and non-transparent materials, such as copper, can also be used. In some embodiments, the row and column traces can be formed on opposite sides of a dielectric material, and can be perpendicular to each other, although in other embodiments other non-orthogonal orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). It should also be noted that in other embodiments, the rows and columns can be formed on a single side of a substrate, or can be formed on two separate substrates separated by a dielectric material. In some embodiments, the dielectric material can be transparent, such as glass, or can be formed from other materials, such as mylar. An additional dielectric cover layer may be placed over the row or column traces to strengthen the structure and protect the entire assembly from damage.

At the "intersections" of the traces, where the traces pass above and below each other (but do not make direct electrical contact with each other), the traces essentially form two electrodes (although more than two traces could intersect as well). Each intersection of row and column traces can represent a capacitive sensing node and can be viewed as picture element (pixel) 126, which can be particularly useful when multi-touch panel 124 is viewed as capturing an "image" of touch. (In other words, after multi-touch subsystem 106 has determined whether a touch event has been detected at each touch sensor in the multi-touch panel, the pattern of touch sensors in the multi-touch panel at which a touch event occurred can be viewed as an "image" of touch (e.g. a pattern of fingers touching the panel).) The capacitance between row and column electrodes appears as a stray capacitance on all columns when the given row is held at DC and as a mutual capacitance Csig when the given row is stimulated with an AC signal. The presence of a finger or other object near or on the multi-touch panel can be detected by measuring changes to Csig. The columns of multi-touch panel 124 can drive one or more analog channels 108 (also referred to herein as event detection and demodulation circuits) in multi-touch subsystem 106. In some embodiments, each column is coupled to one dedicated analog channel 108. However, in other embodiments, the columns may be couplable via an analog switch to a fewer number of analog channels 108.

Computing system 100 can also include host processor 128 for receiving outputs from multi-touch panel processor 102 and performing actions based on the outputs that may include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 may also perform additional functions that may not be related to multi-touch panel processing, and can be coupled to program storage 132 and display device 130 such as an LCD display for providing a user interface (UI) to a user of the device.

Figure 2A:
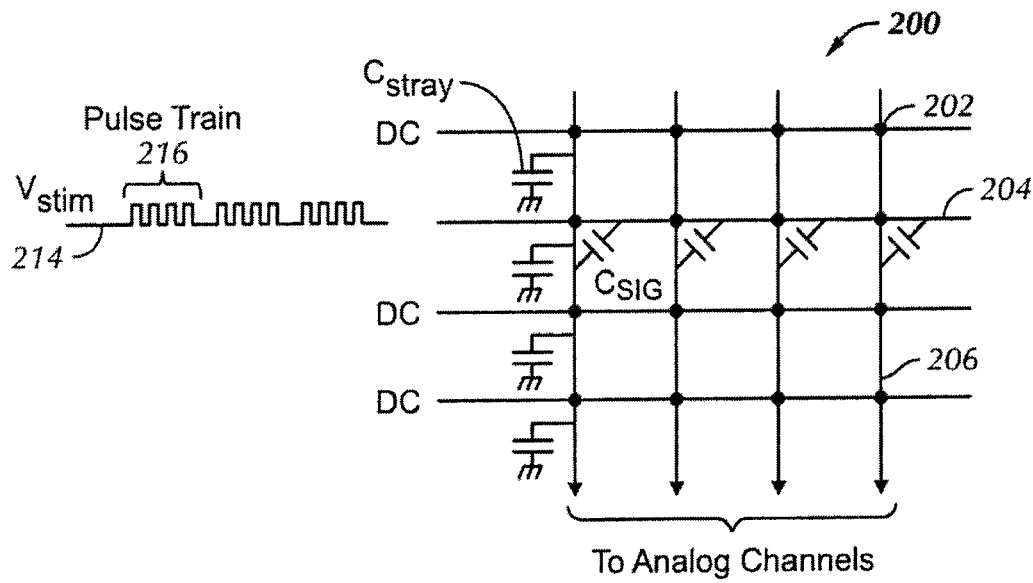
FIG. 2a illustrates a capacitive multi-touch panel in accordance with one embodiment of the invention.

FIG. 2a illustrates exemplary capacitive multi-touch panel 200. FIG. 2a indicates the presence of a stray capacitance Cstray at each pixel 202 located at the intersection of a row 204 and a column 206 trace (although Cstray for only one column is illustrated in FIG. 2 for purposes of simplifying the figure). Note that although FIG. 2a illustrates rows 204 and columns 206 as being substantially perpendicular, they need not be so aligned, as described above. In the example of FIG. 2a, AC stimulus Vstim 214 is being applied to one row, with all other rows connected to DC. The stimulus causes a charge to be injected into the column electrodes through mutual capacitance at the intersecting points. This charge is Qsig=Csig×Vstm. Each of columns 206 may be selectively connectable to one or more analog channels (see analog channels 108 in FIG. 1).

Figure 2B:
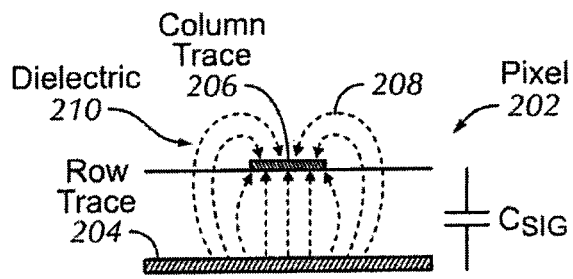
FIG. 2b is a side view of a capacitive touch sensor or pixel in a steady-state (no-touch) condition in accordance with one embodiment of the invention.

FIG. 2b is a side view of exemplary pixel 202 in a steady-state (no-touch) condition. In FIG. 2b, an electric field of electric field lines 208 of the mutual capacitance between column 206 and row 204 traces or electrodes separated by dielectric 210 represents a signal capacitance Csig between the row and column electrodes and can cease a charge to be injected form a stimulated row to a column electrode. Since Csig is referenced to virtual ground, it also makes up a stray capacitance. For example, a total stray capacitance of a column electrode can be the sum of all signal capacitances Csig between a given column and all row electrodes. Assuming that CSig is for example 0.75 pF and a column electrode is intersected by fifteen row electrodes, the total stray capacitance on that column electrode would be at least 15×0.75 pF=11.25 pF. In reality, however, the total stray capacitance is likely larger due to a trace stray capacitance of the column electrode to the multi-touch ASIC or other stray capacitances in the system.

Figure 2C:
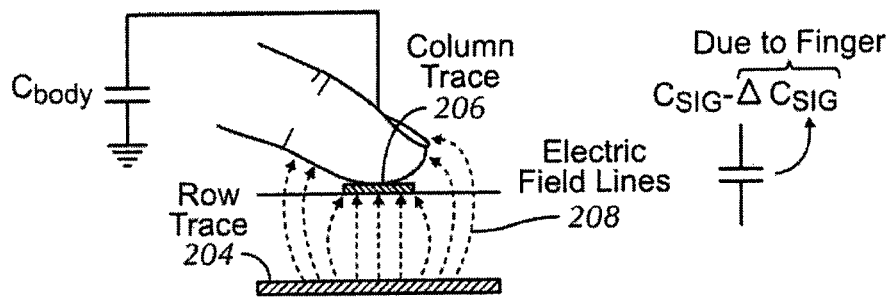
FIG. 2c is a side view of capacitive touch sensor or pixel in a dynamic (touch) condition in accordance with one embodiment of the invention.

FIG. 2c is a side view of exemplary pixel 202 in a dynamic (touch) condition. In FIG. 2c, finger 212 has been placed near pixel 202. Finger 212 is a low-impedance object at signal frequencies, and represents an CA ground return path to via body capacitance Cbody. The body has a self-capacitance to ground Cbody, which is a function of, among other things, body size and geometry. If finger 212 blocks some electric field lines 208 between the row and column electrodes (those fringing fields that exit the dielectric and pass through the air above the row electrode), those electric field lines are shunted to ground through the capacitance path inherent in the finger and the body, and as a result, the steady state signal capacitance Csig is reduced by Csig_sense. In other words, the combined body and finger capacitance act to reduce Csig by an amount ΔCsig (which can also be referred to herein as Csig_sense), and can act as a shunt or dynamic return path to ground, blocking some of the electric fields as resulting in a reduced net signal capacitance. The signal capacitance at the pixel becomes Csig–ΔCsig, where Csig represents the static (no touch) component and ΔCsig represents the dynamic (touch) component. Note that Csig–ΔCsig may always be nonzero due to the inability of a finger, palm or other object to block all electric fields, especially those electric fields that remain entirely within the dielectric material. In addition, it should be understood that as a finger is pushed harder or more completely onto the multi-touch panel, the finger can tend to flatten, blocking more and more of the electric fields, and thus ΔCsig can be variable and representative of how completely the finger is pushing down on the panel (i.e. a range from "no-touch" to "full-touch").

Referring again to FIG. 2a, as mentioned above, Vstim signal 214 can be applied to a row in multi-touch panel 200 so that a change in signal capacitance can be detected when a finger, palm or other object is present. Vstim signal 214 can include one or more pulse trains 216 at a particular frequency, with each pulse train including of a number of pulses. Although pulse trains 216 are shown as square waves, other waveshapes such as sine waves can also be employed. A plurality of pulse trains 216 at different frequencies can be transmitted for noise reduction purposes to minimize the effect of any noise sources. Vstim signal 214 essentially injects a charge into the row via signal capacitance Csig, and can be applied to one row of multi-touch panel 200 at a time while all other rows are held at a DC level. However, in other embodiments, the multi-touch panel may be divided into two or more sections, with Vstim signal 214 being simultaneously applied to one row in each section and all other rows in that region section held at a DC voltage.

Each analog channel coupled to a column can provide a result representing a mutual capacitance between a row being stimulated and a column the row is connected to. Specifically, this mutual capacitance is comprised of the signal capacitance Csig and any change Csig_sense in that signal capacitance due to the presence of a finger, palm or other body part or object. These column values provided by the analog channels may be provided in parallel while a single row is being stimulated, or may be provided in series. If all of the values representing the signal capacitances for the columns have been obtained, another row in multi-touch panel 200 can be stimulated with all others held at a DC voltage, and the column signal capacitance measurements can be repeated. Eventually, if Vstim has been applied to all rows, and the signal capacitance values for all columns in all rows have been captured (i.e. the entire multi-touch panel 200 has been "scanned"), a "snapshot" of all pixel values can be obtained for the entire multi-touch panel 200. This snapshot data can be initially saved in the multi-touch subsystem, and later transferred out for interpretation by other devices in the computing system such as the host processor. As multiple snapshots are obtained, saved and interpreted by the computing system, it is possible for multiple touches to be detected, tracked, and used to perform other functions.

Figure 3A:
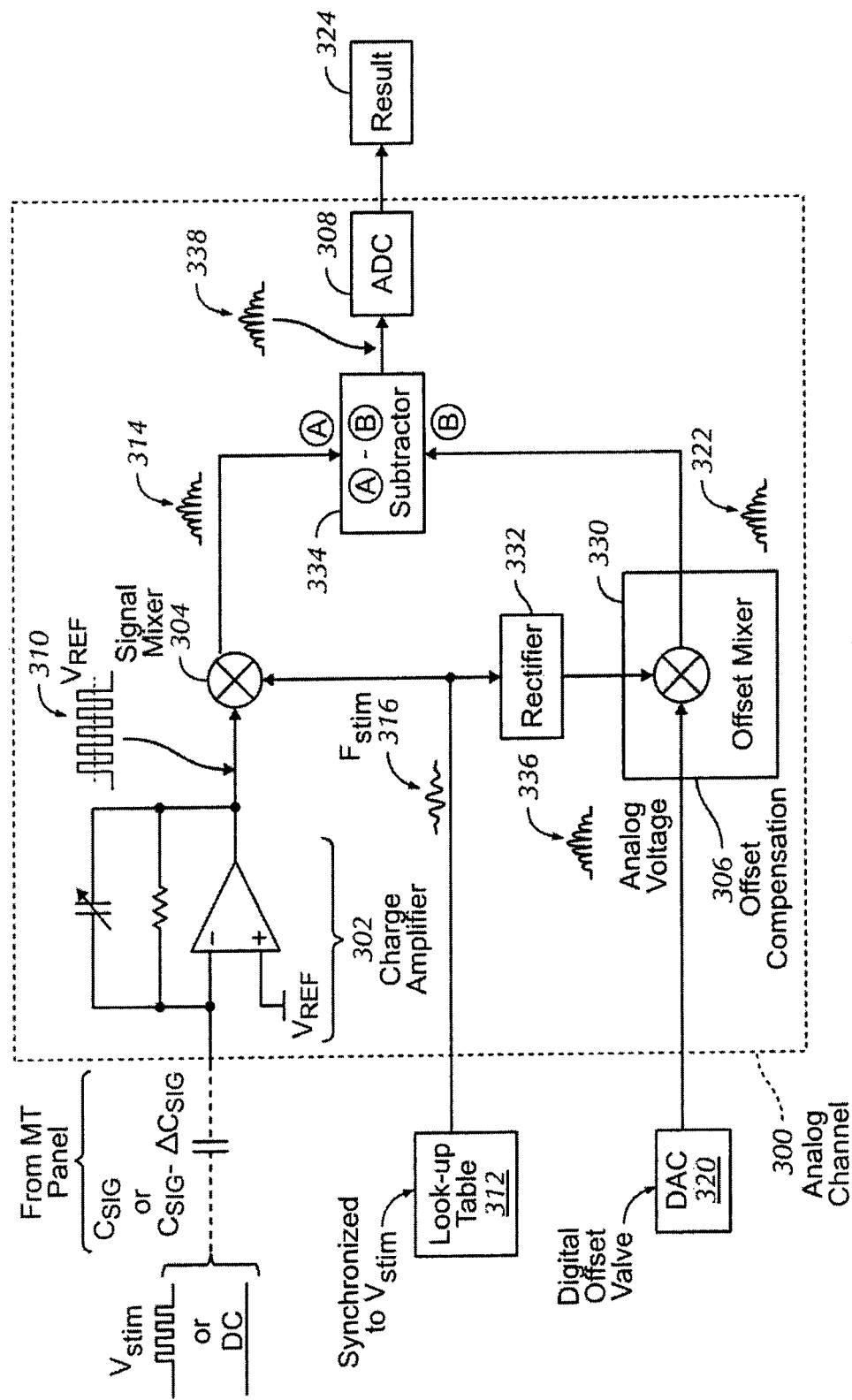
FIG. 3a illustrates an analog channel in accordance with one embodiment of the invention.

FIG. 3a illustrates exemplary analog channel or event detection and demodulation circuit 300. One or more analog channels 300 can be present in the multi-touch subsystem. One or more columns from a multi-touch panel can be connectable to each analog channel 300. Each analog channel 300 can include virtual-ground charge amplifier 302, signal mixer 304, offset compensation 306, rectifier 332, subtractor 334, and analog-to-digital converter (ADC) 308. FIG. 3a also shows, in dashed lines, the steady-state signal capacitance Csig that can be contributed by a multi-touch panel column connected to analog channel 300 when an input stimulus Vstim is applied to a row in the multi-touch panel and no finger, palm or other object is present, and the dynamic signal capacitance Csig−ΔCsig that can appear when a finger, palm or other object is present.

Vstim, as applied to a row in the multi-touch panel, can be generated as a burst of square waves or other non-DC signaling in an otherwise DC signal, although in some embodiments the square waves representing Vstim can be preceded and followed by other non-DC signaling. If Vstim is applied to a row and a signal capacitance is present at a column connected to analog channel 300, the output of charge amplifier 302 can be pulse train 310 centered at Vref with a peak-to-peak (p-p) amplitude in the steady-state condition that is a fraction of the p-p amplitude of Vstim, the fraction corresponding to the gain of charge amplifier 302, which is equivalent to the ratio of signal capacitance Csig and preamplifier feedback capacitance Cfb. For example, if Vstim includes 18V p-p pulses and the gain of the charge amplifier is 0.1, then the output of the charge amplifier can be 1.8V p-p pulses. This output can be mixed in signal mixer 304 with demodulation waveform Fstim 316.

Since the stimulation signal can be a square wave, it may be advantageous to use a sinusoidal demodulation waveform to remove the harmonics of the square wave. In order to reduce the stop band ripple of the mixer at a given stimulation frequency, it can be advantageous to use a Gaussian shaped sinewave. The demodulation waveform can have the same frequency as the stimulus Vstim and can be synthesised from a Lookuptable, enabling generation of any shape of demodulation waveform. Besides Gaussian shaped sinewaves, other waveshapes may be programmed to tune the filter characteristics of the mixers. In some embodiments, Fstim 316 may be tunable in frequency and amplitude by selecting different digital waveforms in the LUT 312 or generating the waveforms differently using other digital logic. Signal mixer 304 may demodulate the output of charge amplifier 310 by subtracting Fstim 316 from the output to provide better noise rejection. Signal mixer 304 may reject all frequencies outside the passband, which may in one example be about +/−30 kHz around Fstim. This noise rejection may be beneficial in noisy environment with many sources of noise, such as 802.11, Bluetooth and the like, all having some characteristic frequency that may interfere with the sensitive (femto-farad level) analog channel 300. Since the frequency of the signals going into the signal mixer can have the same frequency, the signal mixer may be thought of as a synchronous rectifier, such that the output of the signal mixer is essentially a rectified waveform.

Offset compensation 306 can then be applied to signal mixer output 314, which can remove the effect of the static Csig, leaving only the effect of ΔCsig appearing as a result in result register 324. Offset compensation 306 can be implemented using offset mixer 330. Offset compensation output 322 can be generated by rectifying Fstim 316 using rectifier 332, and mixing rectifier output 336 with analog voltage from a digital-to-analog converter (DAC) 320 in offset mixer 330. DAC 320 can generate the analog voltage based on a digital value selected to increase the dynamic range of analog channel 300. Offset compensation output 322, which can be proportional to the analog voltage from DAC 320, can then be subtracted from signal mixer output 314 using subtractor 334, producing subtractor output 338 which can be representative of the change in the signal capacitance ΔCsig that occurs when a capacitive sensor on the row being stimulated has been touched. Subtractor output 338 is then integrated and can then be converted to a digital value by ADC 308. In some embodiments, integrator and ADC functions are combined and ADC 308 may be an integrating ADC, such as a sigma-delta ADC, which can sum a number of consecutive digital values and average them to generate result and store in result register 324.

Figure 3B:
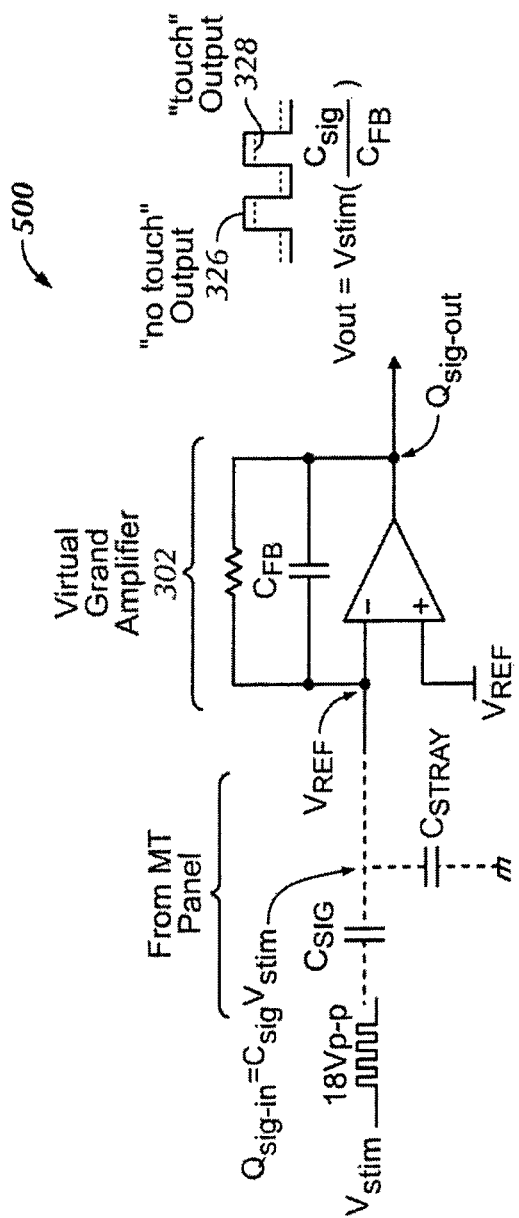
FIG. 3b is a more detailed illustration of a virtual ground charge amplifier at the input of an analog channel, and the capacitance contributed by a capacitive touch sensor and seen by the charge amplifier in accordance with one embodiment of the invention.

FIG. 3b is a more detailed view of charge amplifier (a virtual ground amplifier) 302 at the input of an analog channel, and the capacitance that can be contributed by the multi-touch panel (see dashed lines) and seen by the charge amplifier. As mentioned above, there can be an inherent stray capacitance Cstray at each pixel on the multi-touch panel. In virtual ground amplifier 302, with the + (noninverting) input tied to Vref, the − (inverting) input is also driven to Vref, and a DC operating point is established. Therefore, regardless of how much Csig is present, the − input is always driven to Vref. Because of the characteristics of virtual ground amplifier 302, any charge Qstray that is stored in Cstray is constant, because the voltage across Cstray is kept constant by the charge amplifier. Therefore, no matter how much stray capacitance Cstray is added to the − input, the net charge into Cstray will always be zero. Accordingly, the input charge Qsig_sense=(Csig−ΔCsig_sense) Vstim is zero when the corresponding row is kept at DC and is purely a function of Csig and Vstim when the corresponding row is stimulated. In either case, because there is no charge across Csig, the stray capacitance is rejected, and it essentially drops out of any equations. Thus, even with a hand over the multi-touch panel, although Cstray can increase, the output will be unaffected by the change in Cstray.

The gain of virtual ground amplifier 302 is usually small (e.g. 0.1) and is equivalent to the ratio of Csig (e.g. 2 pF) and feedback capacitor Cfb (e.g. 20 pF). The adjustable feedback capacitor Cfb converts the charge Qsig to the voltage Vout. Therefore, the output Vout of virtual ground amplifier 302 is a voltage that is equivalent to the ratio of −Csig/Cfb multiplied by Vstim referenced to Vref. The high voltage Vstim pulses can therefore appear at the output of virtual ground amplifier 302 as much smaller pulses having an amplitude identified by reference character 326. However, when a finger is present, the amplitude of the output can be reduced as identified by reference character 328, because the signal capacitance is reduced by ΔCsig.

For noise rejection purposes, it may be desirable to drive the multi-touch panel at multiple different frequencies. Because noise typically exists at a particular frequency (e.g., most wireless devices send bursts at a particular frequency), changing the scanning pattern may reduce the system's susceptibility to noise. Accordingly, in some embodiments, channels (e.g., rows) of the multi-touch panel may be stimulated with a plurality of pulse train bursts. For frequency rejection purposes, the frequency of the pulse trains may vary from one to the other.

Figure 3C:
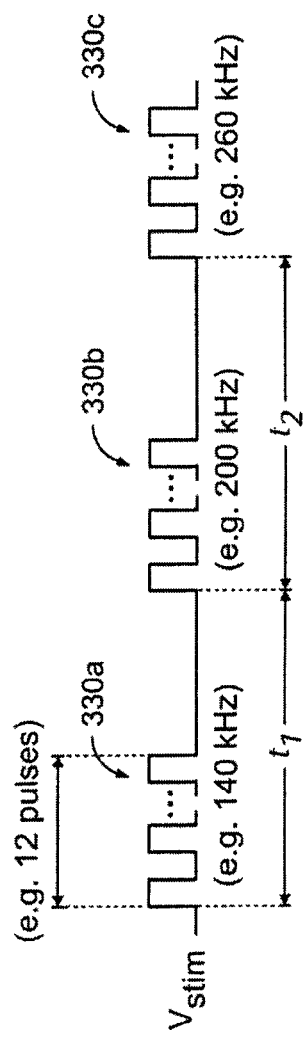
FIG. 3c illustrates a signal with multiple pulse trains each having a fixed number of pulses, each pulse train having a different frequency Fstim in accordance with one embodiment of the invention.

FIG. 3c illustrates an exemplary stimulation signal Vstim with multiple pulse trains 330a, 330b, 330c, each of which have a fixed number of pulses, but have a different frequency Fstim (e.g., 140 kHz, 200 kHz, and 260 kHz). With multiple pulse trains at different frequencies, a different result may be obtained at each frequency. Thus, if a static interference is present at a particular frequency, the results of a signal at that frequency may be corrupted as compared to the results obtained from signals having other frequencies. The corrupted result or results can be eliminated and the remaining results used to compute a final result or, alternatively, all of the results may be used.

In one embodiment, noise rejection can be accomplished by providing multiple pulse trains at different frequencies and applying a "majority rules" algorithm to the result. In a majority rules algorithm, for each sensing node, the two or more values that provide the best amplitude match are averaged and any possibly corrupt values can be disposed of.

Figure 4:
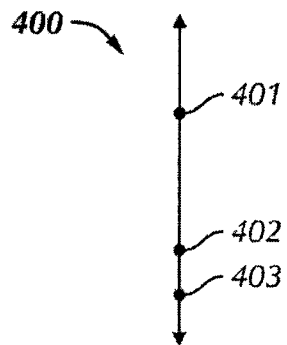
FIG. 4 illustrates noise rejection techniques employed by various filtering algorithms in accordance with one embodiment of the invention.
Figure 5:
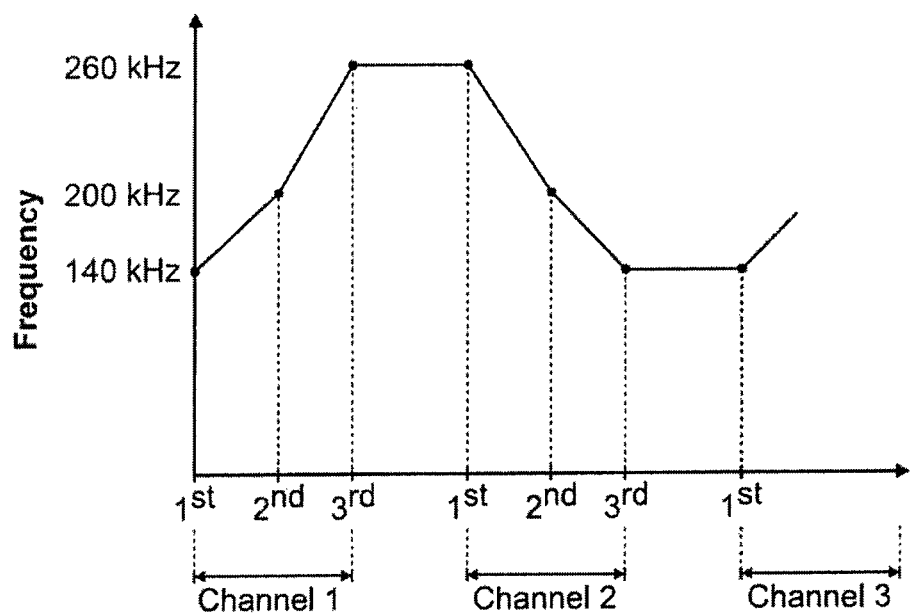
FIG. 5 illustrates a sequence in which stimulus waveforms of varying frequencies are applied to the multi-touch sensor in accordance with one embodiment of the invention.

As an example, in FIG. 4, vertical line 400 represents a spectrum of measured capacitance, where one end of the spectrum may represent larger values and the other end of the spectrum may represent smaller values (or vice versa). Markings 401, 402, and 403 represent three values measured at three different stimulus frequencies Fstim. Values 402 and 403 provide the best match (because their respective values are closer to one another than with value 401), possibly suggesting that value 401 is corrupted. Thus, value 401 may be discarded and values 402 and 403 may averaged to form the output.

Alternatively, a median filter could be applied, in which case value 402 would be selected, i.e., the median value of the values shown in FIG. 4. As yet another alternative, all of the results can be averaged. Accordingly, the three results of FIG. 4 would have a resulting value somewhere between value 401 and 402. A variety of other noise rejection techniques for multiple sample values will be obvious to those skilled in the art, any of which may suitably be used with the controller described herein.

In one embodiment, the frequencies for the individual burst can be selected based on passband characteristics of a mixer and subsequent low pass filter. The width of the passband can be a function of the number of stimulus cycles and, thus, integration interval in a given burst, and the shape of the given synthesized demodulation waveform. Typically, the longer the integration time the narrower the passband. The burst frequencies can be chosen so as to prevent overlap between the individual passbands. If, for example the passband is +/−15 kHz centered around a given stimulation frequency then the stimulation frequencies may be at least 30 kHz apart, otherwise the individual passbands can be overlapping and any noise that falls between the passbands would likely corrupt both frequency channels. Accordingly, for the +/−15 kHz passband, frequencies at 170 kHz, 200 kHz and 230 kHz could be used. However, to allow for some extra margin, extra buffer (e.g. 5 Khz on each side of the individual passband) could be added. In this case, stimulation frequencies would be 160 kHz, 200 kHz and 240 kHz.

In one embodiment, the duty-cycle of the stimulation signal is always kept at 50%, even during the transition of the stimulation frequencies from, e.g., 160 kHz to 200 Khz. To maintain 50% duty-cycle a pixel clock can be kept switched on transitions of a pixel clock divider that generates the stimulus signal. Thus is because any modulation of the duty-cycle on the stimulus during transitions can cause modulation of the average value (e.g., Vref) of the stimulus coming out of the charge amplifier. This may cause saturation in the charge amplifier (which in turn may cause loss of information) and offset drift.

Other frequency variation arrangements are also possible, including applying fewer than three stimulus frequencies Fstim at a given channel, applying more than three stimulus frequencies Fstim, applying the stimulus frequencies Fstim in a quasi random or random sequence rather than the ordered pattern described above, and adaptive frequency variation, in which the stimulus frequencies Fstim are selected based on the noise environment or previous noise results.

Multiple stimulus frequencies Fstims may be applied in different ways to the multi-touch panel. In some embodiments, the same Fstim may be sequentially applied to all channels (rows) (i.e., scanning one frame at a single stimulus frequency), and then repeated for the other, different frequencies. In other embodiments, a low, medium and high frequency Fstim may be applied to one channel, before moving on to the next channel. After an entire "image" is captured, it may be processed. In some embodiments, a lookup table may be used to synthesize a demodulation waveform. The feedback capacitance Cfb and offset may also be programmable.

Referring back to FIG. 1, channel scan logic 110 can be an interface between analog channel block 108, driver logic 114 and RAM 112. Because it may be desirable to autonomously scan multi-touch panel 124 as a background process with little or no interference from a processor (such as processor 102), channel scan logic 110 carries out functions that that may be implemented without intervention from a processor. By having channel scan logic perform scanning functions, a sensor panel processor, such as processor 102, can be freed up to perform other tasks or be powered down to conserve power.

Channel scan logic 110 can control a variety of functions. These functions include, but are not limited to: generating row count; selecting one or more scanning frequency bands; generating timing sequences and obtaining result data; moving data to DTCM when not in autoscan mode (e.g., while in scan-assist mode); comparing scan result data against a threshold value (e.g., in an auto-scan mode); power management control; and performing an auto-scan routine in a low power mode. In one embodiment, channel scan logic 110 is programmed to implement three different modes of operation: stand-alone, master and slave mode. Exemplary master and slave modes of operation are disclosed in more detail in Applicant's concurrently filed U.S. application Ser. No. 11/650,042 entitled "Master/Slave Mode for Sensor Processing Devices," filed on Jan. 3, 2007 and issued as U.S. Pat. No. 7,848,825 on Dec. 7, 2010, the contents of which are herein incorporated by reference.

Figure 6:
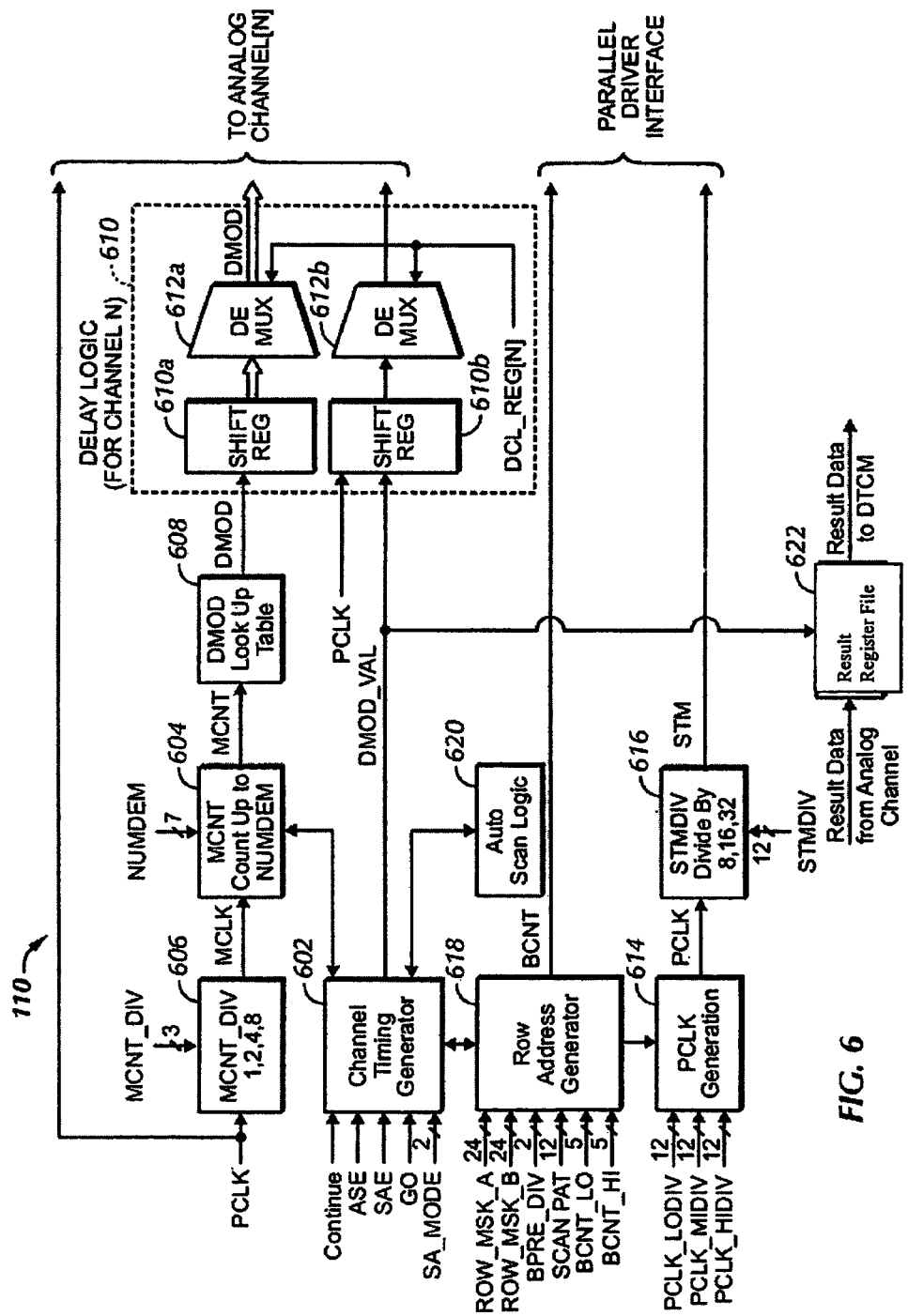
FIG. 6 is a block diagram illustrating logic circuitry of channel scan logic in accordance with one embodiment of the invention.

FIG. 6 is a block diagram illustrating channel scan logic 110 in accordance with one embodiment. One skilled in the art will appreciate that channel scan logic 110 can be formed in a number of different ways to accomplish one or more of the functions described in this disclosure.

Channel scan logic 110 may include channel timing and delay generation logic. Channel timing generator 602 generates a timing sequence for an analog to digital converter (ADC), for example ADC 308 of FIG. 3a and for the corresponding sensor panel 126. In one embodiment, channel timing generator 602 produces timing sequences (e.g., the ADC_CH signal in FIG. 7) having three distinct sections:

ADC reset: this section clears an ADC and its digital output register at the beginning of a timing sequence;

ADC acquisition period: this section is the time used to acquire an output; and

ADC result register write: at an end of the acquisition period, the ADC output is stored in a result register, then moved to a channel scan result register file and then transferred to a memory unit, such as a data tightly coupled memory (DTCM), for processing.

In one embodiment, timing generator 602 is a state machine. A state machine can comprise logic circuitry formed using any one of a plurality of designs and technologies, including ASIC designs, field programmable gate array designs and general purpose processor technology whose operation logic is defined by software. In general, however, a state machine is formed to define operational logic to carry out the functions described herein.

Further to FIG. 6, counter timer MCNT 604 tracks a sampling time (e.g., the ADC acquisition period time it takes to sample sensor panel 124). Counter MCNT can be reset at a beginning of a timing sequence and can be clocked by clock signal MCLK, which is a divided version of a clock signal PCLK. Clock signal MCLK may be generated by a divider MCNT_DIV 606, which divides clock signal PCLK by a counter divide ratio MCNT_DIV. The counter divide ratio MCNT_DIV can be, for example, 1, 2, 4, or 8, and can be programmable through and provided by a count divide register (not shown). A timing sequence is completed and ADC result registers 324 are updated after counter MCNT 604 reaches a value equal to a predetermined number of demodulated signal values NUMDEM plus a predetermined delay value DCL_REG, as will be explained in further detail below.

In one embodiment, the number of demodulated signal values NUMDEM is the total number of demodulator values used to form a demodulated waveform. The value NUMDEM can be programmable through and provided to the MCNT counter 604 by a number count register (not shown). The MCNT signal, which can be generated from the MCNT counter 604, can be an address used to retrieve demodulator values DMOD from demodulator lookup table 608. Due to band pass filter characteristics of many sensor panels, such as multi-touch panel 124, a feedback signal (e.g., output of the sensor panel) may be delayed with respect to a stimulus signal driving the sensor panel. Therefore, delay logic 610 can be implemented to delay a demodulation waveform with respect to a feedback signal to compensate for any sensor panel delay. A DCL memory unit (e.g., RAM) can store a DCL value for every panel pixel. The size of the DCL memory unit can be N×M, whereas N is the number of rows and M is the number of columns. In one embodiment, a row and column vector is used. The row vector can have as many DCL values as there are rows in the panel and the column vector can have as many DCL values as there are columns in the panel. The DCL value for each channel can then be calculated by summing the column value associated with that channel and the row value associated with the row currently being processed.

In accordance with one embodiment of the present invention, to delay a demodulation waveform, the output from demodulator lookup table 608 is fed into shift register 610a and multiplexer 612a. A delayed version of the demodulator lookup table value DMOD is applied to analog channel n while scanning a corresponding row based on an appropriate DCL_REG value. Similarly, in one embodiment, an ADC control signal (DMOD_VAL) for channel n (which can indicate to analog channel n whether the delayed DMOD being applied to channel n is valid) can be delayed according to the corresponding DCL_REG value via shift register 610b and multiplexer 612b.

Figure 7:
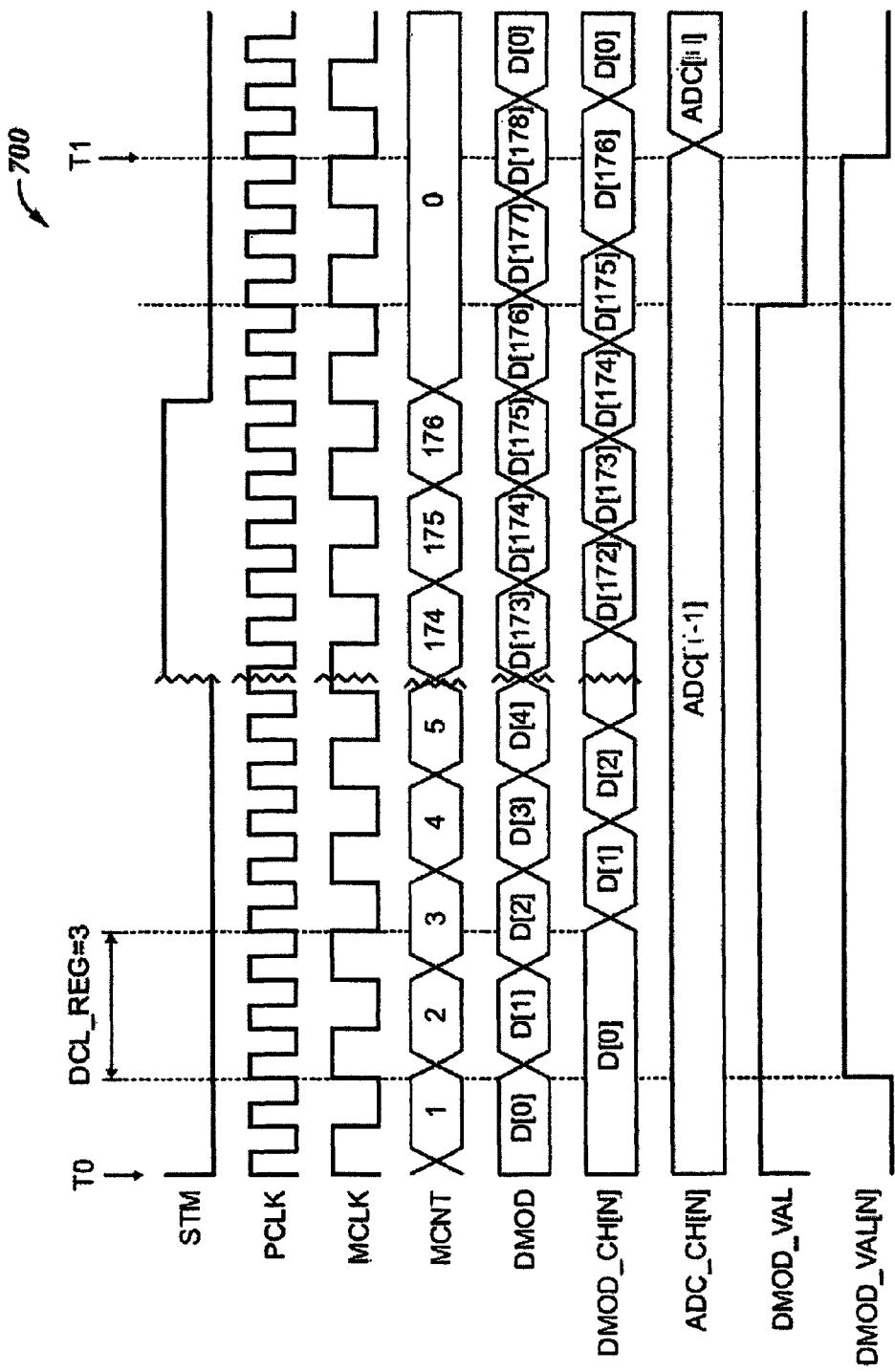
FIG. 7 illustrates channel timing sequences associated with the channel logic of FIG. 6 in accordance with one embodiment of the invention.

Further understanding of the timing features of channel scan logic 110 may be had with reference to a timing sequence 700 illustrated in FIG. 7. In this exemplary sequence 700, while scanning a corresponding row, channel n has a delay value DCL_REG of three (DCL_REG=3). Stimulation signal STM is a signal driving a sensor (e.g., sensor 126) via a parallel driver interface (e.g., driver logic 118). Stimulation signal STM may be derived from a clock signal PCLK generated from PLCK generator 614 and divided by stimulation divider 616.

Channel timing sequence 700 can be initiated by a falling edge of the stimulation signal STM at time T0. The value MCNT, which represents the address to the demodulator lookup table 608, is incremented by clock signal MCLK on every second rising edge of clock signal PCLK because the counter divide ratio is two in this example (MCNT_DIV=2). Accordingly, a demodulator value DMOD corresponding to the current MCNT value is retrieved on the next rising edge of clock signal MCNT. The demodulator signal for channel n (DMOD_CH[N]) and the DMOD_VAL for channel n (DMOD_VAL[N]) are delayed with respect to the demodulator multiplier DMOD and ADC control signal DMOD_VAL by way of shift register 610a and delay value of channel n DCL_REG[N] (which in this example equals three PCLK cycles because DCL_REG=3).

At time T1, after the last delayed demodulator value DMOD_CH[N] has reached channel n, DMOD_VAL[N] is de-asserted, the corresponding ADC result register 324 is updated and the ADC control signal and MCNT counter 604 are reset in preparation for the next timing sequence. The next timing sequence may be initiated on the next falling edge of stimulation signal STM.

Further to FIG. 6, Channel logic 110 may also control a range of rows of a sensor panel to be sampled during a given scan as well as the manner in which the rows are scanned. In one embodiment, BPRE_DIV value can be used to configure the number of timing sequences performed per row, each at a different frequency. The low timing sequence may be associated with a stimulus signal modified by a PCLK_LODIV value received from a PCLK_LODIV register (not shown) in PCLK generator 614. Similarly, medium and high timing sequences may be associated with stimulus frequencies programmed via PCLK_MIDIV and PCLK_HIDIV registers (not shown), respectively.

In one embodiment, BCNT_LO and BCNT_HI registers may contain parameters used to adjust a range of rows to be scanned. For example, when a new range of rows is to be scanned, a BCNT register (not shown) can be updated with the most recent BCNT_LO value. If the next row in a sequence is equivalent to the BCNT_HI value, a flag (FRAME-DONE_FLAG) is set to indicate that all rows in a frame are scanned.

In one embodiment, individual row can be enabled via a row mask register (ROW_MSK), by setting a bit associated with a row (e.g., to 1). Similarly, resetting a bit associated with a row (e.g., 0) can disable an associated row. Accordingly, if a row is disabled, that row is not scanned. When a channel timing sequence completes a row, Row address Generator 618 can advance the row count (BCNT) to the next enabled row. This BCNT can be routed to the interface of the high voltage driver 118 to determine which row of sensor panel 124 driver logic 114 should apply stimulation to.

A channel mask CH_MSK can also be used in a similar fashion as the row mask ROW_MSK to enable and disable particular channels during one or more scans of a sensor panel.

Timing sequences may be programmable via a scan pattern SCAN_PAT register (not shown). For example, a scan pattern value SCAN_PAT applied to row address generator 618 and Channel timing Generator 602 can control a scan pattern for a total of two rows or six individual timing sequences when three different timing sequences are used. In one embodiment, a scan pattern value SCAN_PAT can vary the timing as follows: low-medium-high in a first row and high-medium-low in a second row. In another embodiment, the scan pattern value SCAN_PAT can vary the timing as follows: low-medium-high in a first row and low-medium-high in a second row.

In some embodiments, the ADC result data may be transferred from result register 324 to DTCM automatically. For example, multi-touch subsystem 106 may have a temporary buffer to store a plurality of channels worth of data. In addition to ADC result register 324, result register file 622 can be reserved for storing result data, enabling storage of ADC results acquired at various frequencies of a stimulation signal (e.g., low, medium and high), or of ADC results acquired for various rows. Result register file 622 contents may be automatically transferred to DTCM dependant on the setting of flags (ARM_BUF) of processor 102. This enables transfer of a plurality of rows worth of data to DTCM (if processor 102 desires) while a new timing sequence is in progress.

Referring back to FIG. 6, channel scan logic 110 may also include auto-scan logic 620. In general, auto-scan logic 620 may be used to autonomously scan a plurality of sensors without intervention from a processor, such as the multi-touch processor 102. This is referred to as "auto-scan mode". Auto-scan mode enables the system 100 to completely shut down one or more processors and high frequency system clocks, thereby conserving power. When activity is detected during an auto-scan mode, a processor may be activated to check for valid data. An example of auto-scan logic is discussed in more detail in Applicant's concurrently filed U.S. application Ser. No. 11/650,040 entitled "Multi-touch Auto Scanning," filed on Jan. 3, 2007 and published as U.S. Published Application No. 2008/0162996 on Jul. 3, 2008, the contents of which are incorporated by reference herein.

In accordance with various embodiments of the present invention, channel scan logic 110 may implement scanning functions in a number of different ways. Four exemplary implementations include a continuous mode, a row-by-row mode, a frame-by-frame mode and a dual frame mode. Each of these modes is discussed below in more detail.

A continuous mode, in accordance with one embodiment, comprises scanning a sensor panel, such as panel 124 continuously until the processor explicitly asks channel scan logic 110 to stop scanning, or until all memory units designated for result data (e.g., result registers 324, result register file 622, and DTCM buffer) are full. ADC result data can be continuously moved from result registers 324 (in analog channel 300, 1 per channel) to the result register file 622 in channel scan logic 110 to a DTCM buffer (in DTCM). The scanning can stop, as mentioned above, when result registers 324 are occupied, the result register file 622 is full, and the processor signals that it cannot take any more data to the DTCM buffer for processing. Channel scan logic can start scanning again once the processor allows more data to be moved to the DTCM buffer (e.g., by setting an appropriate ARM_BUF flag), which in turn, allows data to be moved from result registers 324 to result register file 622, which, in turn, releases result registers 324 to store data for a next scan.

In one embodiment, a row-by-row mode generally comprises scanning a first row of multi-touch panel 124 and then waiting to scan a next row until a processor provides channel scan logic with permission to do so. An associated processor may require that the data received from a first scan be processed before giving permission to scan a second row.

A frame-by-frame mode generally comprises scanning an entire frame of a sensor panel, such as panel 124, and then waiting until processor 102 provides channel scan logic 110 with permission to scan the frame again or a further frame. In one embodiment, an associated processor processes the data received from a first frame scan before giving permission to perform a second frame scan. In one embodiment, the channel scan logic powers down the ADC channels in between frame scans to reduce power consumption.

A dual frame mode can be a sub-mode of continuous mode and frame-by-frame mode. For example, the channel scan logic 110 can operate in continuous mode or a combination of continuous mode and dual frame mode. In continuous mode, the channel scan logic may use a set of selection (received from register INMUX, not shown) to multiplex columns of multi-touch panel 124 to analog channels 108, and a set of channel mask CH_MSK. In combination of continuous mode and dual frame mode, the channel scan logic may use two sets of selection (received from register INMUX0 and INMUX1, not shown) to multiplex columns of multi-touch panel 124 to analog channels 108, and two sets of channel masks (CH_MSK0 and CH_MSK1, not shown). The channel scan logic uses INMUX0 and CH_MSK0 when scanning the multi-touch panel the $0^{th}$, $2^{nd}$, $4^{th}$ . . . $n^{th}$ times. It uses INMUX1 and CH_MSK1 when scanning the $1^{st}$, $3^{rd}$, $5^{th}$ . . . $(n+1)^{th}$ times.

In other implementations, channel scan logic 110 may be programmed to use only a few channels or skip every-other channel or row. Row masks or channel masks, as described above, can be enabled so that scans skip rows or channels, respectively. Accordingly, channel scan logic 110 can be very flexible.

Figure 8A:
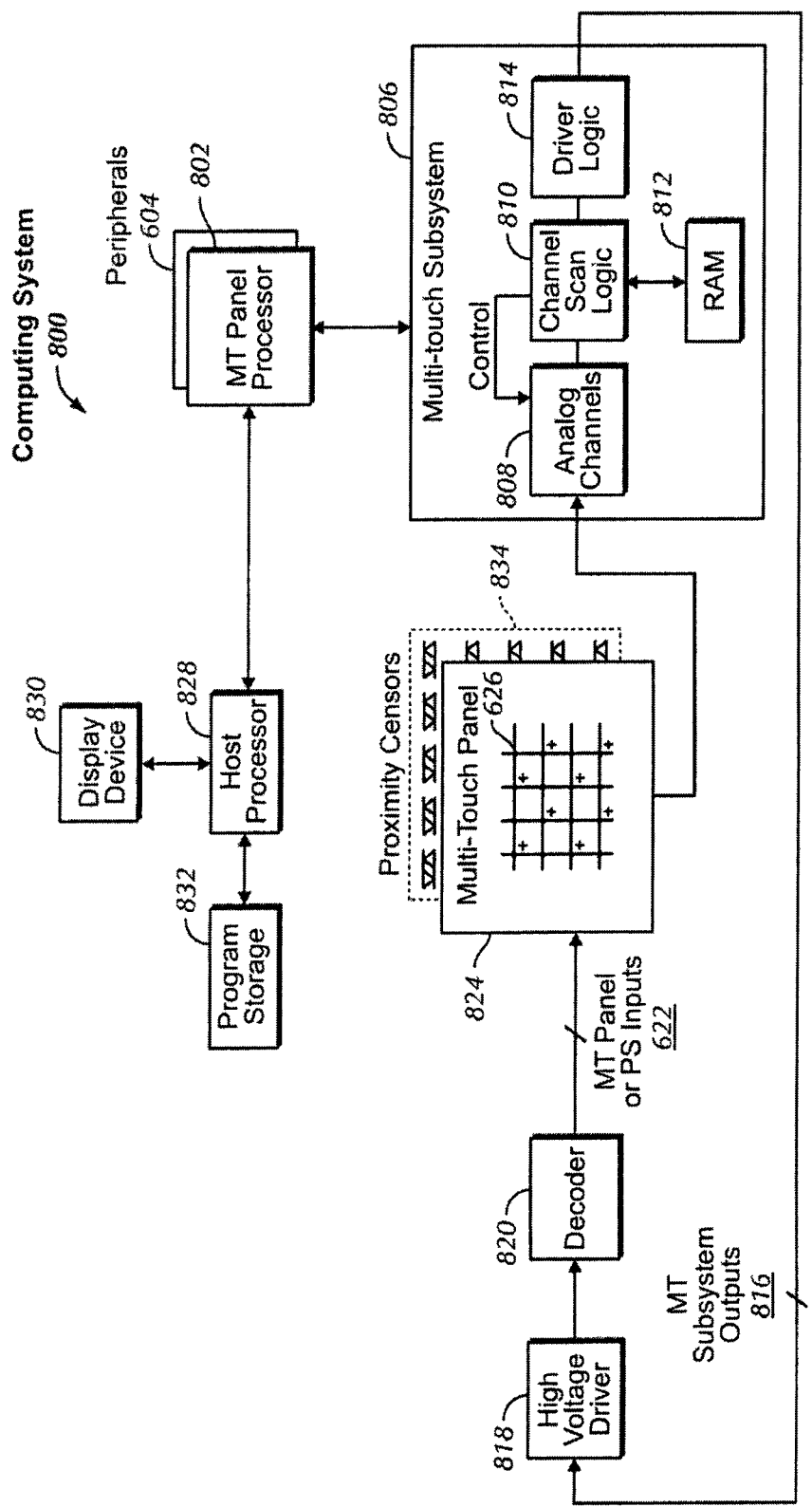
FIG. 8a illustrates an exemplary computing system utilizing both a multi-touch panel and proximity sensor according to various embodiments of the invention.

FIG. 8a illustrates an exemplary computing system 800 utilizing both touch sensors and proximity sensors according to some embodiments of the invention. The computing system 800 may correspond to computing devices such as desktops, laptops, tablets or handhelds, including personal digital assistants (PDAs), digital audio and/or video players and mobile telephones. The computing system 800 may also correspond to public computer systems such as information kiosks, automated teller machines (ATM), point of sale machines (POS), industrial machines, gaming machines, arcade machines, vending machines, airline e-ticket terminals, restaurant reservation terminals, customer service stations, library terminals, learning devices, and the like.

The computing system 800 may include one or more multi-touch panel processors 802 and peripherals 804, and a multi-touch subsystem 806. The multi-touch subsystem 806 may include, but is not limited to, analog channels 808, channel scan logic 810 and driver logic 814. The channel scan logic 810 may access RAM 812, autonomously read data from the analog channels and provide control for the analog channels. This control may include multiplexing columns of multi-touch panel 824 or outputs of proximity sensors 834 to analog channels 808. In addition, channel scan logic 810 may control the driver logic and the scanning of multi-touch panel 834 and proximity sensors 834 (i.e., controlling the application of stimulation signals to individuals rows of multi-touch panel 824 and proximity sensors 834).

Driver logic 814 may provide multiple multi-touch subsystem outputs 816 and may present a proprietary interface that drives high voltage driver 818. High voltage driver 818 may provide level shifting from a low voltage level to a higher voltage level, providing a better signal-to-noise (S/N) ratio for noise reduction purposes. The high voltage driver outputs may be sent to decoder 820, which may selectively connect one or more high voltage driver outputs to one or more multi-touch panel row or proximity sensor inputs 822 through a proprietary interface and enable the use of fewer high voltage driver circuits in high voltage driver 818. Each multi-touch panel row input 822 may drive one or more rows in multi-touch panel 824 or one or more proximity sensors 834. Proximity sensors 834, although illustrated as a proximity sensor panel having evenly spaced proximity sensors for purposes of illustration only, may also be a proximity sensor panel with unevenly spaced or clustered proximity sensors, one or more rows of proximity sensors, or even a single proximity sensor. Furthermore, although FIG. 8 shows separate multi-touch panel 824 overlaying separate proximity sensor panel 834, in some embodiments the multi-touch and proximity sensor panels may be integrated together, or adjacent to each other without any overlap.

Array of touch-sensitive pixels 826 in the multi-touch panel 824 may be able to capture an "image" of touch. Additionally, the one or more proximity sensors 834, which may be located within multi-touch panel 824 or separate from the panel, may also be able to capture an "image" of touch or hover. In other words, after multi-touch subsystem 106 has determined whether a hover event has been detected at each proximity sensor, the pattern of proximity sensors at which a hover event occurred may be viewed as an "image" of hover (e.g. a finger-shaped pattern)). The columns of multi-touch panel 824 and one or more proximity sensors 834 may drive analog channels 808 in multi-touch subsystem 806.

Computing system 800 may also include host processor 828 for performing additional functions that may not be related to multi-touch panel processing, and may be coupled to program storage 832 which may include, but is not limited to, Read-Only Memory (ROM), Random-Access Memory (RAM), a hard disk drive, removable storage media that may include, for example, CD-ROM, DVD, PC-CARD, flash, floppy disk, magnetic tape, and a network component. Host processor 828 may also be coupled to display device 830 for providing a user interface (UI) to a user of the device. Display device 830 may be configured to display a graphical user interface (GUI) that may include a pointer or cursor as well as other information to the user. By way of example, display device 830 may be a monochrome display, color graphics adapter (CGA) display, enhanced graphics adapter (EGA) display, variable-graphics-array (VGA) display, super VGA display, liquid crystal display (e.g., active matrix, passive matrix and the like), cathode ray tube (CRT), plasma display and the like.

Computing system 800 in the example of FIG. 8*a* may be able to advantageously implement a number of functions using both touch sensors and proximity sensors as input devices, providing enhanced capabilities not possible with only touch sensor inputs. For example, the touch sensors may be utilized to implement the function of "pushing" a virtual button that appears on the multi-touch panel due to an underlying LCD when a finger touches down over the virtual button, while the proximity sensors may be utilized to implement the function of "pushing" a virtual button when a finger merely hovers over the virtual button without actually making contact with the multi-touch panel. Additionally or alternatively, merely by placing a finger, hand or other object near a proximity sensor, a user may be able to turn the entire multi-touch panel on or off, turn portions of the panel on or off, power down a particular subsystem such as the multi-touch subsystem, enable only certain features, dim or brighten the display, etc. Additionally or alternatively, merely by placing a finger, hand or other object near a proximity sensor, the proximity sensor may cause virtual buttons on the LCD to be highlighted without actually "pushing" those buttons, to alert the user that a virtual button is about to be pushed should the user actually touch the multi-touch panel.

Figure 8B:
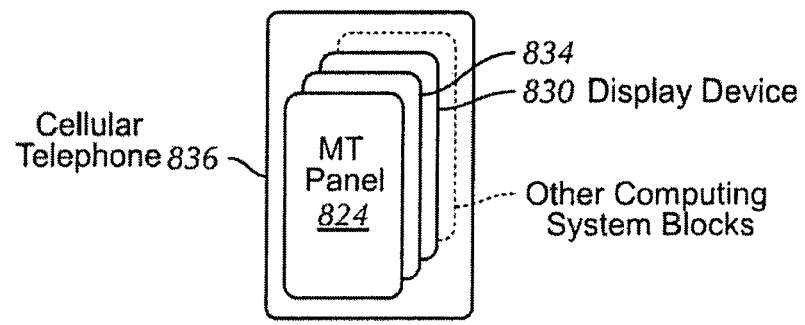
FIG. 8b illustrates an exemplary mobile telephone that may include multi-touch panel, display device, and other computing system blocks according to one embodiment of the invention.

FIG. 8*b* illustrates an exemplary mobile telephone 836 that may include multi-touch panel 824, proximity sensors 834, display device 830, and other computing system blocks in computing system 800 of FIG. 8*a*. In the example of FIG. 8*b*, if a user's cheek or ear is detected by one or more proximity sensors, computing system 800 may determine that mobile telephone 836 is being held up to the user's head, and therefore some or all of multi-touch subsystem 806, multi-touch panel 824 and proximity sensors 834 may be powered down along with display device 830 to save power. One or more proximity sensors can also detect that the device is inside a pocket, with the same result.

Figure 8C:
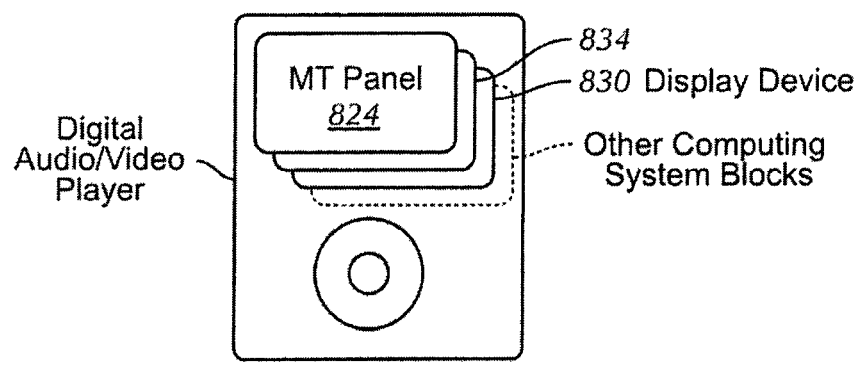
FIG. 8c illustrates an exemplary digital audio/video player that may include a multi-touch panel, a display device, and other computing system blocks according to one embodiment of the invention.

FIG. 8*c* illustrates an exemplary digital audio/video player that may include multi-touch panel 824, proximity sensors 834, display device 830, and other computing system blocks in the computing system 800 of FIG. 8*a*.

While this invention has been described in terms of several preferred embodiments, there are alterations, permutations, and equivalents, which fall within the scope of this invention. For example, the term "computer" does not necessarily mean any particular kind of device, combination of hardware and/or software, nor should it be considered restricted to either a multi purpose or single purpose device. Additionally, although the embodiments herein have been described in relation to touch screens, the teachings of the present invention are equally applicable to touch pads or any other touch surface type of sensor. Furthermore, although the disclosure is primarily directed at capacitive sensing, it should be noted that some or all of the features described herein may be applied to other sensing methodologies. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for detecting an object touching or hovering near a touch sensor panel, comprising:
   continuously and autonomously scanning the touch sensor panel substantially free of intervention from a processor and storing scan data in a first memory unit until a first event is detected;
   moving the stored scan data to a second memory unit when the first event is detected; and
   resuming the scanning of the touch sensor panel when a second event is detected.

2. The method of claim 1, wherein the first event comprises a notification that the first memory unit is full.

3. The method of claim 1, wherein the first event comprises a request from the processor to stop scanning.

4. The method of claim 1, wherein the second event comprises a notification that the first memory is not full.

5. The method of claim 1, wherein the second event comprises a request from the processor to resume scanning.

6. An apparatus for detecting an object touching or hovering near a touch sensor panel, comprising:
   a touch sensor panel;
   first and second memory units; and
   scan logic communicatively coupled to the touch sensor panel and the first memory unit and configured for
      continuously and autonomously scanning the touch sensor panel substantially free of intervention from a processor and storing scan data in the first memory unit until a first event is detected,
      moving the stored scan data to the second memory unit when the first event is detected, and
      resuming the scanning of the touch sensor panel when a second event is detected.

7. The apparatus of claim 6, wherein the first event comprises a notification that the first memory unit is full.

8. The apparatus of claim 6, further comprising:
   a processor communicatively coupled to the scan logic and the first memory unit;
   wherein the first event comprises a first request from the processor to stop scanning.

9. The apparatus of claim 8, wherein the second event comprises a second request from the processor to resume scanning.

10. The apparatus of claim 6, wherein the second event comprises a notification that the first memory is not full.

11. A method for detecting an object touching or hovering near a touch sensor panel, comprising:
   scanning a first portion of the touch sensor panel substantially free of intervention from a processor;
   processing data obtained from the scan of the first portion while waiting for permission to scan a second portion of the touch sensor panel; and
   scanning the second portion after receiving permission to scan the second portion.

12. The method of claim 11, wherein the first portion is a first frame of the touch sensor panel and the second portion is another frame of the touch sensor panel.

13. The method of claim 11, wherein the first portion is a first row of the touch sensor panel and the second portion is another row of the touch sensor panel.

14. The method of claim 11, further comprising powering down receive channel circuitry while waiting for permission to scan the second portion.

15. An apparatus for detecting an object touching or hovering near a touch sensor panel, comprising:
   a touch sensor panel;
   scan logic communicatively coupled to the touch sensor panel and configured for
      scanning a first portion of the touch sensor panel substantially free of intervention from a processor,
      processing data obtained from the scan of the first portion while waiting for permission to scan a second portion of the touch sensor panel, and
      scanning the second portion after receiving permission to scan the second portion.

16. The apparatus of claim 15, wherein the first portion is a first frame of the touch sensor panel and the second portion is another frame of the touch sensor panel.

17. The apparatus of claim 15, wherein the first portion is a first row of the touch sensor panel and the second portion is another row of the touch sensor panel.

18. The apparatus of claim 15, further comprising:
   a processor communicatively coupled to the scan logic;
   wherein the scan logic is further configured for powering down receive channel circuitry while waiting for permission to scan the second portion.

* * * * *